E. G. CARR.
SUBGRADE SCRAPER.
APPLICATION FILED MAR. 7, 1917. RENEWED NOV. 15, 1917.
1,268,925.
Patented June 11, 1918.
2 SHEETS—SHEET 1.
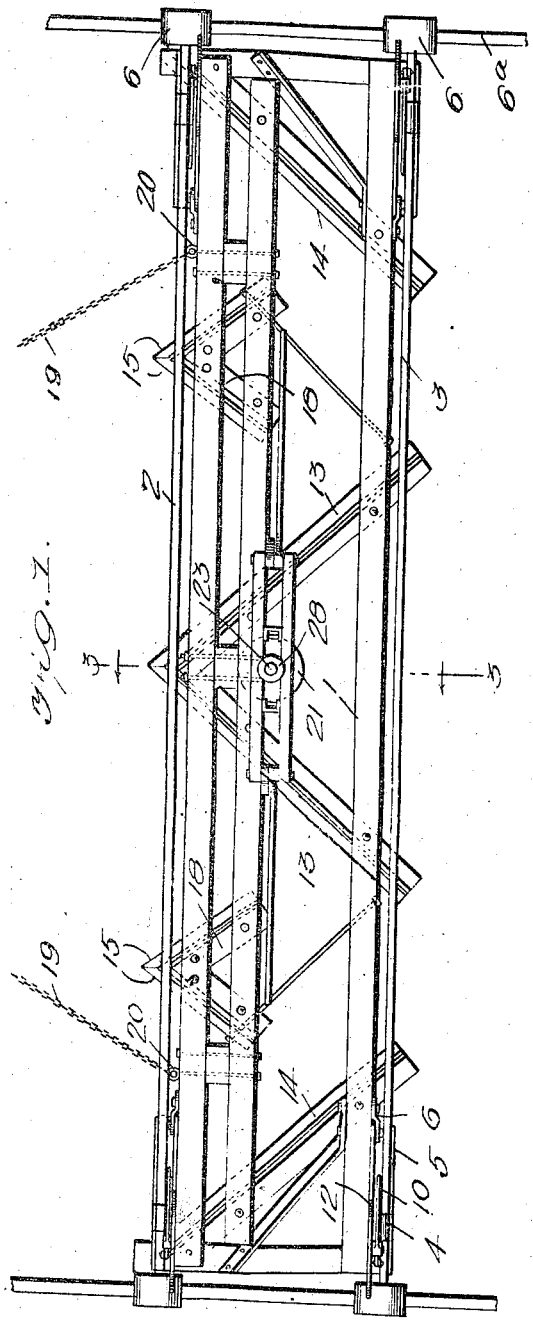
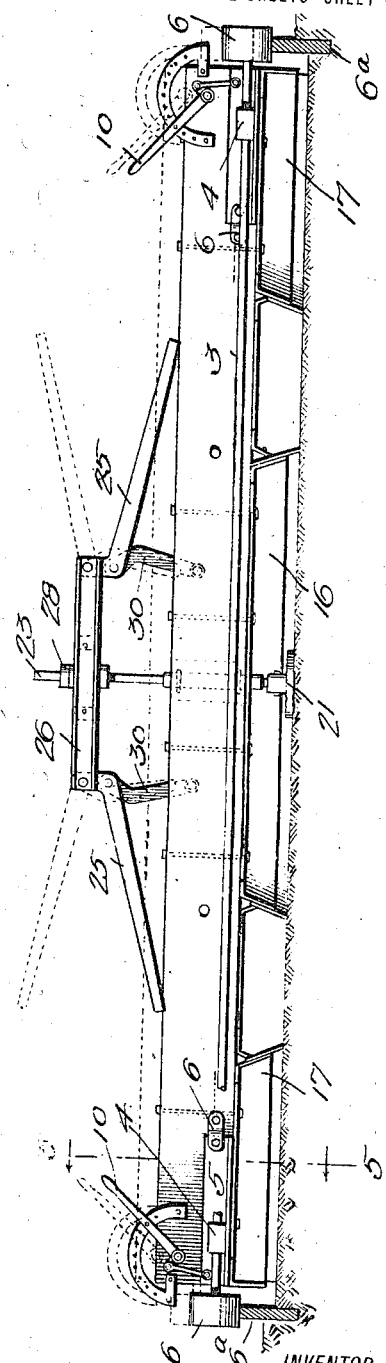
WITNESSES
INVENTOR
Edward G. Carr
BY
ATTORNEYS E. G. CARR.
SUBGRADE SCRAPER.
APPLICATION FILED MAR. 7, 1917. RENEWED NOV. 15, 1917.
1,268,925.
Patented June 11, 1918.
2 SHEETS—SHEET 2.
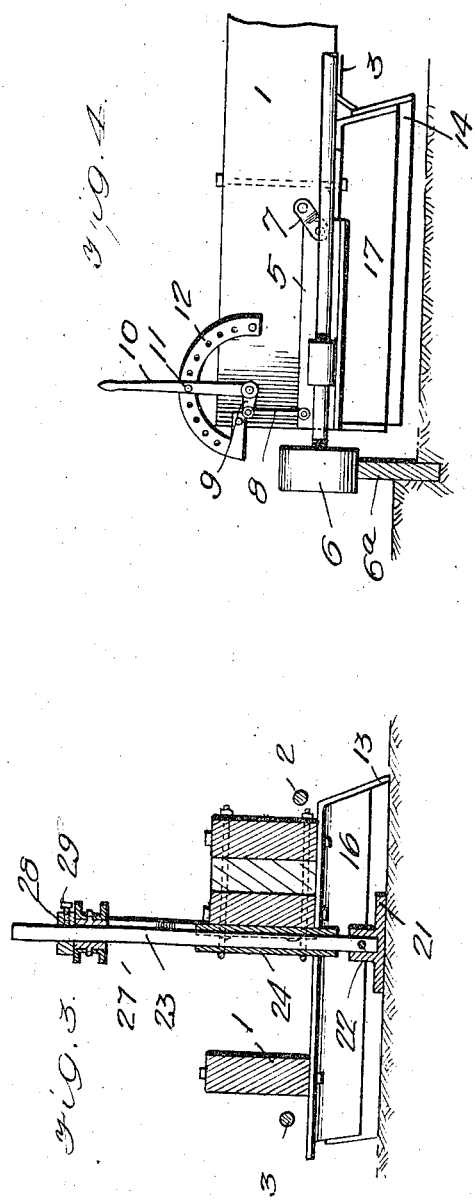
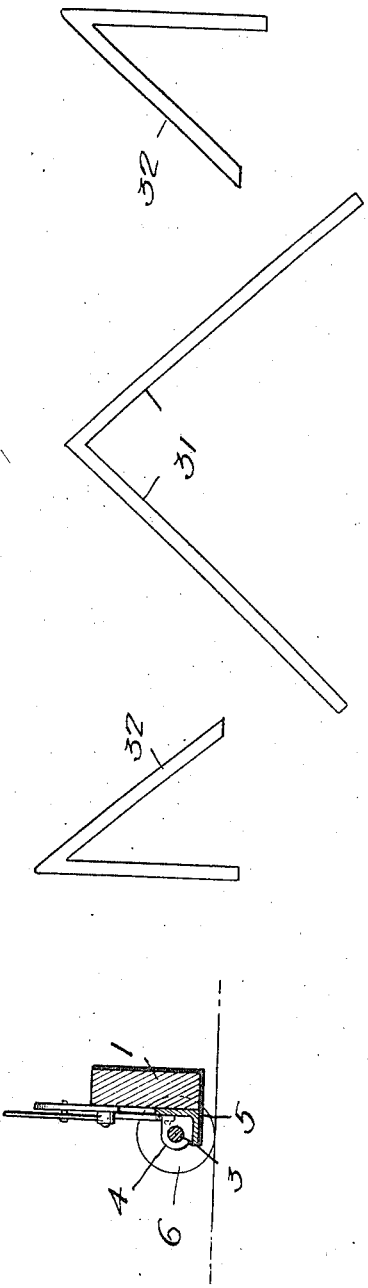
WITNESSES
F. C. Barry
W. E. Beck
INVENTOR
Edward G. Carr
BY Munn & Co.
ATTORNEYS

UNITED STATES PATENT OFFICE.

EDWARD GEORGE CARR, OF OAKLAND, CALIFORNIA.

SUBGRADE-SCRAPER.

1,268,925.   Specification of Letters Patent.   Patented June 11, 1918.

Application filed March 7, 1917, Serial No. 153,044. Renewed November 15, 1917. Serial No. 202,257.

*To all whom it may concern:*

Be it known that I, EDWARD G. CARR, a citizen of the United States, and a resident of Oakland, in the county of Alameda and State of California, have invented certain new and useful Improvements in Subgrade-Scrapers, of which the following is a specification.

My invention is an improvement in sub-grade scrapers, and has for its object to provide mechanism of the character specified adapted to run upon the header boards or forms and to cut away the surface of the grade, and wherein the cutting blades may be adjusted to any desired depth, and wherein means is provided for permitting the scraper to be turned without the necessity of removing it from the roadway.

In the drawings:

Figure 1 is a top plan view of the improved scraper,

Fig. 2 is a rear view,

Fig. 3 is a section on the line 3—3 of Fig. 1, looking in the direction of the arrows adjacent to the line, Fig. 4 is a partial rear view showing the method of adjusting the wheels, Fig. 5 is a section on the line 5—5 of Fig. 2, looking in the direction of the arrows adjacent to the line, and Fig. 6 is a diagrammatic view showing a modified arrangement of the blades.

In the embodiment of the invention shown in Figs. 1 to 5, the scraper comprises a suitable frame 1 of substantially rectangular outline, and shafts 2 and 3 are journaled longitudinally of the frame at the opposite sides thereof, and outside of the frame. These shafts are journaled in bearings 4 on adjusting plates 5, which are supported by the frame, and wheels 6 are journaled on the ends of the shaft. These wheels are adapted to run upon the header boards or form boards 6ª for the roadway, and the adjusting plates are adapted to be moved upward or downward in order to move the shafts 2 and 3 with respect to the frame.

These adjusting plates 5 are supported at their inner ends by links 7, each link being pivoted at one end to the frame and at the other to the plate, and the said plates are of angle material, as shown. The outer end of each plate is connected by a link 8, with an angular lug 9 on a lever 10 pivoted on the frame, and having a transverse pin 11 which is adapted to engage with one of a series of openings in a quadrant 12 secured to the frame for holding the lever in adjusted position. It will be evident that by means of the levers 10 the shafts may move vertically with respect to the frame, in order to raise or lower the frame with respect to the wheels. Scraper blades 13, 14 and 15 are supported from the frame depending below the same in inclined position, the blades 13 and 15 being arranged in pairs.

As shown in Fig. 1, the blades 13 are at the center of the frame, being arranged in inverted V-shape. The blades 14 are inclined inwardly from front to rear, and the rear end of each blade 14 is spaced apart from the rear end of the adjacent blade 13. Each pair of blades 15 is arranged in inverted V-shape in front of the space between the adjacent pair of blades 13 and 14. The blades 13 are connected with a suitable supporting frame 16 of angle material, and each blade 14 is connected to a similar supporting frame 17, the frames 16 and 17 being connected with the main frame 1. Each pair of blades 15 is connected with the supporting frame 18, the said frames 16, 17 and 18 being of angle material, as shown more particularly in Fig. 2, each frame having a portion secured to the main frame and the other portion depending therefrom for the detachment of the blade.

Suitable draft apparatus, indicated at 19, is connected with the front of the frame by means of eyebolts 20, the said draft apparatus being chains, in the present instance, which may be attached to a suitable motor. A shoe 21 of circular form is arranged at the center of the frame, the said shoe having a step bearing or hub 22, into which engages the lower end of a shaft 23. This shaft is mounted for vertical movement in a bearing sleeve 24 secured to the main frame, and it is moved vertically by means of elbow levers 25. Each of these levers consists of a long arm and a short arm, the short arm being pivoted between the adjacent ends of a pair of channel bars 26. The channel bars are arranged with their channels outward and in spaced relation, and a bushing 27 is arranged on the shaft between the channel bars, the said bushing being secured to the channel bars as shown in Figs. 2 and 3.

A stop collar 28 is held on the shaft above the bushing, by means of a set screw 29, and a link 30 connects each lever 25 with the frame. These links are pivoted at their upper ends to the levers at the junction of the angular portion, and at their lower ends to the frame, and it will be evident that when the levers are moved into full line position of Fig. 2, the shoe will be lifted, while when the levers are moved into the dotted line position of said figure, the shoe will be lowered.

It will be evident that when the device is in operation with the wheels 6 on the header boards 6ª, and with the shafts 2 and 3 properly adjusted, the scraper blades 13, 14 and 15 will remove the top layer of soil and will throw it into two long heaps or windrows. The device may be adjusted to cut out any desired depth. Instead of arranging the blades in the manner shown in Fig. 1, they may be arranged as shown in Fig. 6, wherein a central pair of blades 31 is provided arranged in inverted V-shape and lateral blades 32, the blades 31 and 32 being so arranged that their rear ends will lap to completely loosen the top layer of soil. By means of the shoe, the scraper may be turned or reversed without removing it from the roadway. When the levers 25 are swung in the proper direction, the shoe will be lowered into contact with the ground, and the further movement of the levers in the same direction will lift the frame, which being supported by the shoe and pivoted to the shaft 23, may be swung about end for end and then lowered into place.

It will be noticed that the bushing 27 has oppositely extending pintles, which are journaled in the channel bars. Thus the frame may swing in the direction of its length vertically with respect to the ground when it is lifted by the shoe.

I claim:

1. A scraper of the character specified comprising a frame, scrapers carried by the frame, wheels for supporting the frame and means at the center of the frame for raising the frame, the frame being rotatable on the said means, and the said means comprising a shoe adapted to engage the ground, a shaft journaled on the frame to which the lower end of the shoe is connected, a bearing frame through which the shaft extends, said shaft having fixed collars above and below the frame, elbow levers pivoted to the ends of the frame, and links connecting the said levers with the main frame.

2. A scraper of the character specified comprising a frame, scrapers carried by the frame, shafts extending longitudinally of the frame at opposite sides thereof and at the outer sides of the frame, wheels on the ends of the shafts, a connection between each shaft and the frame for permitting the shaft to be raised or lowered with respect to the frame and to be held in adjusted position, and means at the center of the frame for raising the frame, the frame being rotatable on the said means.

EDWARD GEORGE CARR.

Witnessed by—
CHAS. RIFLYERY,
J. D. LACKMAN.